United States Patent [19]

Kawada

[11] Patent Number: 4,837,650
[45] Date of Patent: Jun. 6, 1989

[54] HEAD POSITIONING DEVICE

[75] Inventor: Junji Kawada, Kamakura, Japan

[73] Assignee: Mitsubishi Denki Kabushiki Kaisha, Tokyo, Japan

[21] Appl. No.: 203,596

[22] Filed: Jun. 6, 1988

Related U.S. Application Data

[63] Continuation of Ser. No. 920,135, Oct. 17, 1986, abandoned.

[30] Foreign Application Priority Data

Oct. 17, 1985 [JP] Japan ............................ 60-231812

[51] Int. Cl.$^4$ ..................... G11B 21/08; G11B 5/55
[52] U.S. Cl. .................................. 360/106; 74/89.2
[58] Field of Search .............. 360/106, 105, 97–99; 74/89.2

[56] References Cited

U.S. PATENT DOCUMENTS

| | | | |
|---|---|---|---|
| 4,161,004 | 7/1979 | Dalziel | 360/106 |
| 4,164,769 | 8/1979 | Kaseta et al. | 360/106 |
| 4,198,871 | 4/1980 | Dunn et al. | 74/89.2 |
| 4,263,632 | 4/1981 | Burke, Jr. et al. | 360/106 |
| 4,305,104 | 12/1981 | Donohue | 360/106 |
| 4,353,262 | 10/1982 | Talbot | 74/89.2 |
| 4,399,477 | 8/1983 | Bryer | 360/106 |
| 4,419,707 | 12/1983 | Woodier | 360/106 |
| 4,550,623 | 11/1985 | Gysling | 74/89.2 |
| 4,654,736 | 3/1987 | Kaczeus | 360/106 |

FOREIGN PATENT DOCUMENTS

| | | |
|---|---|---|
| 0060341 | 9/1982 | European Pat. Off. |
| 2418515 | 9/1979 | France |
| 60-236170 | 5/1984 | Japan |
| 60-209979 | 10/1985 | Japan |

OTHER PUBLICATIONS

Castrodale et al., "Magnetic Head Band Access Mechanism", IBM Technical Disclosure Bulletin, vol. 17, No. 1, Jun. 1974, pp. 196–197.
Bailey, "Drive Band/Pulley Attachment for Magnetic Head", IBM Technical Disclosure Bulletin, vol. 17, No. 11, Apr. 1975, pp. 3428–3429.
Bailey, "Idler System for Transducer Supporting Band", IBM Technical Disclosure Bulletin, vol. 17, No. 11, Apr. 1975, pp. 3426–3427.

Primary Examiner—John H. Wolff
Assistant Examiner—Matthew J. Bussan
Attorney, Agent, or Firm—Oblon, Spivak, McClelland, Maier & Neustadt

[57] ABSTRACT

A head positioning device used for a disc type memory system comprises a head being movable by a metallic band wherein the metallic band is extended between a capstan and an idle roller in a loop form, and the metallic band is wound around the capstan with at least one turn.

5 Claims, 3 Drawing Sheets

HEAD POSITIONING DEVICE

This application is a continuation of application Ser. No. 06/920,135, filed on Oct. 17, 1986, now abandoned.

BACKGROUND OF THE INVENTION

The present invention relates to a head positioning device used for a memory system, for use in a computer, such as a magnetic disc type memory system utilizing a disc as a recording medium and having a read/write head movable to a position.

As the devices of this kind, there have been known a loop-winding system such that a metallic band is extended between a capstan and an idle roller as shown in FIG. 7, and an α-winding system as desclosed, for instance, in U.S. Pat. No. 4,161,004 (Japanese Unexamined Patent Publication No. 123911/1978) as shown in FIG. 8.

In these Figures, a reference numeral 1 designates a magnetic disc as a recording medium, a numeral 2 designates a read/write head, a numeral 3 designates a carriage to which a magnetic head 2 is attached, a numeral 4 designates a head driving motor such as a step motor, a numeral 5 designates a capstan attached to the shaft of the motor 4, a numeral 6 designates an idle roller, a numeral 7 designates a metallic band extended between the capstan 5 and the idle roller 6, the metallic band supporting the carriage 3, and a numeral 8 designates a band fixing piece. In FIG. 8, a numeral 9 designates a supporting piece for supporting the metallic band wound around the capstan 5 in a form of a letter of a.

The operation of the conventional devices will be described.

In the both devices, the head driving motor 4 rotates the capstan 5. Since the metallic band 7 wound around the capstan 5 is secured at its part to the capstan 5 by the band fixing piece 8 or spot-welding, the movement of rotation of the capstan 5 gives to the metallic band 7 a linear motion. Accordingly, the carriage 3 attached to the metallic band 7 undergoes the linear movement in accordance with the movement of rotation of the motor 4 so that the carriage is stopped at a desired position. In the loop-winding system as shown in FIG. 7, the idle roller 6 is pulled by a spring to give an appropriate tension to the band 7 so that the quantity of movement of the carriage 3 resulted when the capstan 5 is turned to a direction is not different from the quantity of movement of the carriage 3 resulted when the capstan 5 is turned to the other direction. On the other hand, in the α-winding system as shown in FIG. 8, the supporting piece 9 is used to secure one end of the band 7 and a plate spring (not shown) is disposed to connect the other end of the band 7, whereby a tension is given to the band 7.

In the conventional loop-winding system as shown in FIG. 7, the angle of rotation of the capstan 5 cannot exceed 180°. Accordingly, when the same pitch of feeding of the carriage as in the α-winding system capable of rotating the capstan by nearly 360° is to be given, it is necessary to make the diameter of the capstan greater than that used for α-winding system as shown in FIG. 8 and to use a highly accurate step motor in which an pitch angle is reduced to about half. In the α-winding system, while the capstan 5 can rotate by nearly 360°, it is necessary to provide a space for allowing the supporting piece 9 to move in the opposite direction of the head 2. Accordingly, miniaturization of the device is hindered.

SUMMARY OF THE INVENTION

It is an object of the present invention to eliminate the disadvantages as above-mentioned and to provide a head positionng device which makes its size small to the same extent as the loop-winding system using the idle roller and provides the substantially same angle of rotation of the capstan as in the α-winding system.

The foregoing and the other objects of the present invention have been attained by providing a positioning device for a read/write head for a disc type memory system, the head being movable by a metallic band, characterized in that the metallic band is extended between a capstan and an idle roller in a loop form in such a manner that the metallic band is wound around the capstan with at least one turn.

DETAILED DESCRIPTION OF THE PREFERRED EMBODIMENTS

An embodiment of the present invention will be described with reference to the drawings.

Figure 1:
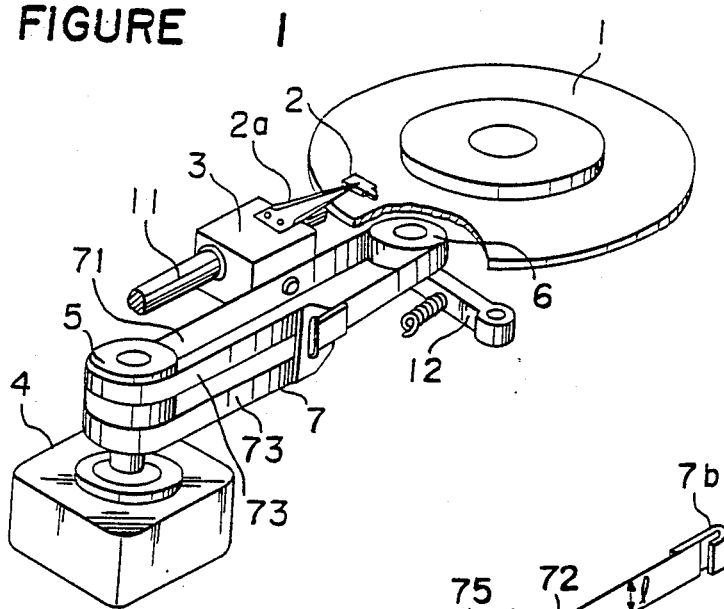
FIG. 1 is a perspective view showing an embodiment of the head positioning device of the present invention.
Figure 3:
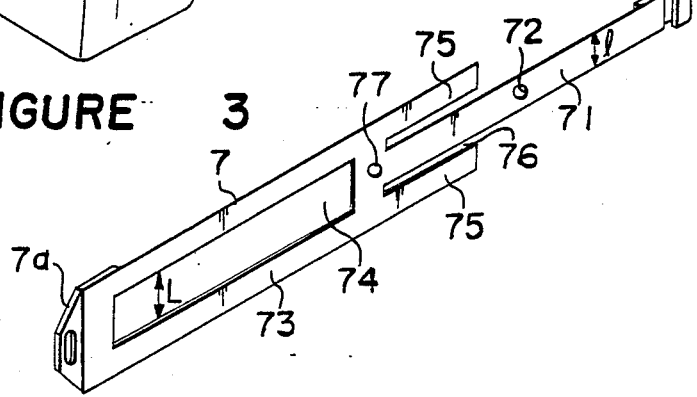
FIGS. 2 and 3 are respectively perspective views showing the metallic band in a state that it is wound around the capstan and in a developed state.

In FIG. 1, a reference numeral 1 designates a magnetic disc as a recording medium, a numeral 2 designates a read/write head, a numeral 3 designates a carriage which holds the head 2 by means of a plate spring 2a, a numeral 4 designates a head driving motor such as a step motor, a numeral 5 designates a capstan supported by a motor shaft, and a numeral 6 designates an idle roller. A numeral 7 designates a metallic band extended between the capstan 5 and the idle roller 6 in a loop form. The metallic band 7 is made of a thin stainless steel. The metallic band 7 comprises a first portion 71 and a second portion 73 which are integrally formed with each other via a middle portion 100. The first portion 71 extends from the middle portion 100 of the metallic band 7 in a form of a first strip and the second portion 73 is a second strip extending from the middle portion of the metallic band 7 in the opposite direction with respect to the first portion 71, wherein an elongated rectangular opening 74 is formed at its central portion by stamping operations, as shown in FIG. 3. A fitting hole 72 is formed in the first portion 71. The second portion 73 is provided with a pair of tongue portions 75 extending in parallel to and at both sides of the first portion, remaining slits 76 between the tonque portions 75 and the first portion 71.

The width l of the first portion 71 is determined to be smaller than the width L of the opening 73 formed by stamping operations, and the length of the tongue portions 75 extending in the longitudinal direction of the first portion 71 is made about half of the outer circumference of the capstan 5.

A numeral 77 designates a connecting hole for connecting the metallic band 7 to the capstan 5 at a fixing point s by fitting a projection (not shown) formed on the capstan 5 into the connecting hole 77.

Figure 2:
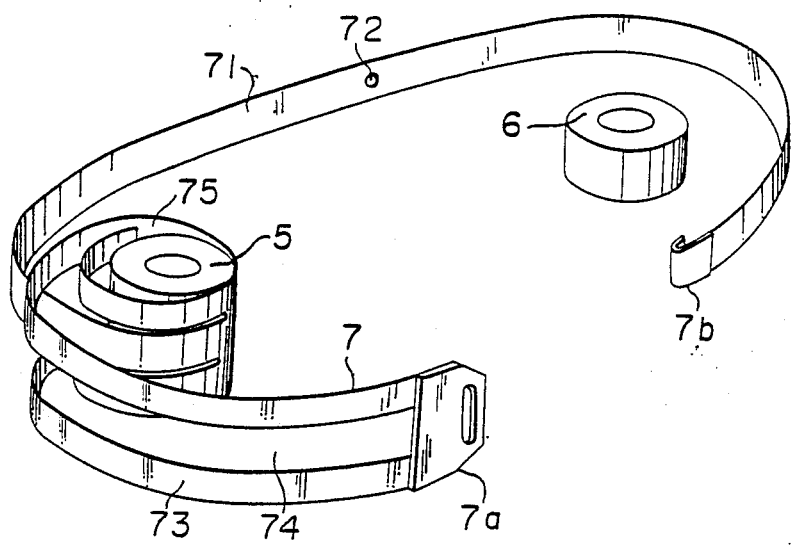

As shown in FIGS. 2 and 3, the metallic band is once wound around the capstan 5 in a split form, and a portion 7a formed at its one end of the metallic band 7 is engaged with a hook portion 7b formed at the other end. A numeral 10 designates a fixing portion for fixing the carriage 3 to the metallic band 7, the fixing portion being fitted to the fitting hole 72 formed in the first portion 71, a numeral 11 designates a guide rod for holding the carriage 3 and a numeral 12 designates a spring for providing a tension to the idle roller 6.

Figure 4:
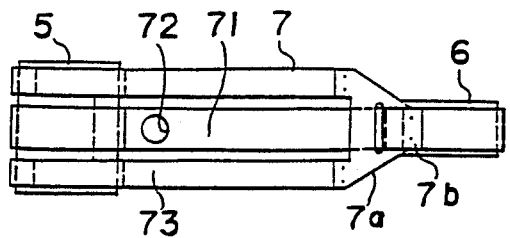
FIGS. 4 to 6 respectively show plan views and a side view showing operation of the device; and, FIGS. 7 and 8 are respectively perspective views of the devices of the conventional loop-winding system and the α-winding system.

The metallic band is wrapped around the capstan 5 by passing the first portion 71 through the stamped opening 74 formed in the second portion; thus, the condition of the metallic band 7 to the capstan as shown in FIG. 4 is obtainable. As can be seen from FIG. 2, the band 7 is wound about the capstan by 540°, i.e., $n+(\frac{1}{2})n$ turns, where n is a positive integer.

Figure 5:
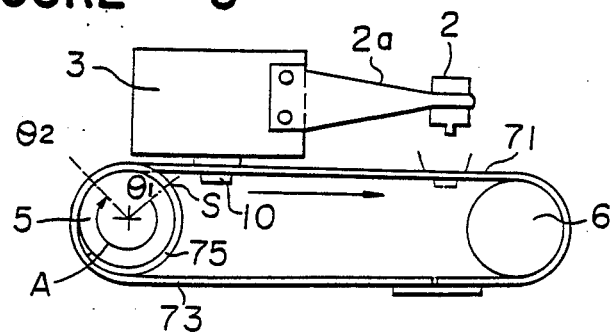
Figure 6:
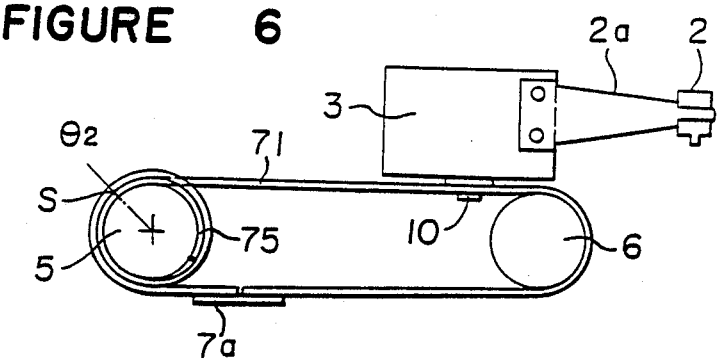
Figure 7:
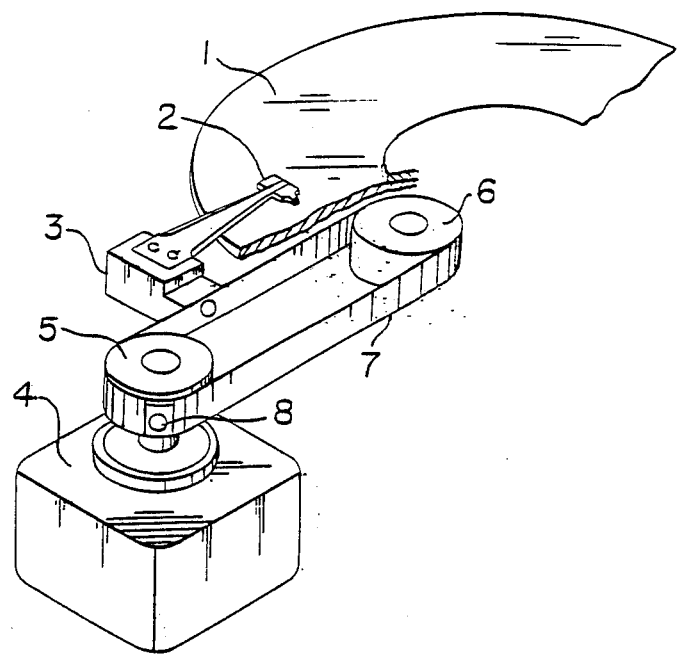
Figure 8:
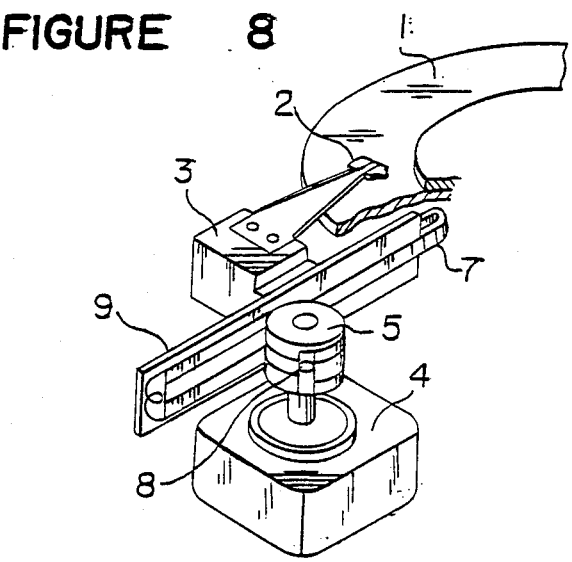

In the operation of the positioning device having the construction as above-mentioned, when the capstan 5 is rotated in the direction of the arrow mark A (in the clockwise direction) as shown in FIG. 5 by a motor (not shown), the capstan 5 functions in such a manner that in the plan view of FIG. 5, the upper part of the capstan 5 feeds the metallic band 7, while the lower part winds it, whereby the carriage 3 is moved in the direction of the arrow mark B. FIG. 6 shows a state that the carriage 3 is moved in the arrow mark B direction. In a series of the above-mentioned operations, the capstan 5 can rotates from an angular position $\theta_1$ as shown in FIG. 5 to an angular position $\theta_2$ as shown in FIG. 6 in the direction of the arrow mark A, without causing separation of a fixing point s from the capstan 5 (namely, the capstan 5 rotates without causing slippage of the metallic band 7). The angle of rotation can be at least 270'. With such structure, the angle of rotation can be made large even though the diameter of the capstan 5 is small. The band supporting piece 9 as used in the conventional head positioning device becomes unnecessary. Accordingly, it is unnecessary to provide a space at the opposite side of the capstan 5 with respect to the carriage 3.

A pair of tongue portions provide smooth movement of the band 7 around the capstan 5, and prevent the band from the breaking due to the concentration of stress at a step portion produced during the movement of the band 7 around the capstan 5.

In the above-mentioned embodiment, description has been made as to the head positioning device used for the magnetic disc memory system. However, the present invention is applicable to a head positioning device for an optical disc type memory system and another system.

As described above, in accordance with the present invention, the metallic band is extended between the capstan and idle roller in a loop form and the metallic band is wound around the capstan with at least one turn. Accordingly, an angle of rotation of the capstan can be made large to nearly 360° while the size of the device can be made relatively small and performance of the driving motor is effectively utilized. Thus, the positioning device of the present invention provides both advantages given by the conventional loop-winding system and the α-winding system.

I claim:

1. A positioning device for a read/write head, comprising:
    a rotatable capstan;
    an idle roller;
    an elongate metallic band comprising:
        (a) a middle portion,
        (b) a first portion forming a first strip integral with said middle portion and extending from said middle portion in a longitudinal direction of said band,
        (c) a second portion forming a second strip integral with said middle portion and extending from said middle portion in a direction opposite that of said first strip, said second strip having an opening, and
        (d) a pair of tongue portions integral with said middle portion and extending therefrom in the same direction as said first portion, said tongue portions being positioned on opposite sides of said first portion and being separated therefrom by slits;
    means for fixing said band to said capstan; and means for fixing a read/write head to said band, whereby said tongue portions provide smooth movement of said band around said capstan and prevent said band from breaking due to stress concentrations during movement of said band around said capstan.

2. The positioning device for a read/write head according to claim 1, wherein the length of the tongue portions in the direction of extent of the first portion is about half of the outer circumference of the capstan.

3. The positioning device for a read/write head according to claim 1, wherein the opening of the second portion is rectangular in shape and has a width in a direction transverse to the direction of extent of the first portion which is greater than the width of the first portion.

4. A positioning device for a read/write head for a disc type memory system, comprising:
    a rotatable capstan;
    a single idle roller;
    an elongate metallic flat band extending in a closed loop between said capstan and said idle roller, said band being wound about said idle roller and being wound about said capstan by substantially $n+(\frac{1}{2})n$ turns, where n is a positive integer, whereby said band extends directly from said capstan to said idle roller in a closed loop;
    means for fixing said read/write head to a portion of said band between said idle roller and said capstan; and
    means for rotating one of said capstan and idle roller.

5. The positioning device of claim 4 wherein said band is fixed to said capstan.

* * * * *